US009458548B2

United States Patent
Cheng et al.

(10) Patent No.: US 9,458,548 B2
(45) Date of Patent: Oct. 4, 2016

(54) METHOD FOR PRODUCING ALUMINA TEMPLATE OF NANORODS, ALUMINIA TEMPLATE, AND NANORODS

(71) Applicant: SOUTHERN TAIWAN UNIVERSITY, Tainan (TW)

(72) Inventors: Hsyi-En Cheng, Tainan (TW); Bo-Jiun Yeh, Tainan (TW)

(73) Assignee: SOUTHERN TAIWAN UNIVERSITY, Tainan (TW)

( * ) Notice: Subject to any disclaimer, the term of this patent is extended or adjusted under 35 U.S.C. 154(b) by 594 days.

(21) Appl. No.: 13/963,296

(22) Filed: Aug. 9, 2013

(65) Prior Publication Data

US 2013/0327741 A1 Dec. 12, 2013

Related U.S. Application Data

(62) Division of application No. 13/324,343, filed on Dec. 13, 2011, now Pat. No. 8,679,221.

(51) Int. Cl.
| | |
|---|---|
| *C25D 11/04* | (2006.01) |
| *B22F 9/16* | (2006.01) |
| *C23C 28/00* | (2006.01) |
| *B22F 1/00* | (2006.01) |
| *C22C 14/00* | (2006.01) |
| *C22C 19/03* | (2006.01) |
| *C22C 29/12* | (2006.01) |
| *B82Y 30/00* | (2011.01) |
| *C25D 1/00* | (2006.01) |
| *C25D 1/04* | (2006.01) |
| *C25D 11/20* | (2006.01) |
| *C25D 11/24* | (2006.01) |
| *C22C 21/00* | (2006.01) |
| *B82Y 40/00* | (2011.01) |

(52) U.S. Cl.
CPC .......... *C25D 11/045* (2013.01); *B22F 1/0025* (2013.01); *B22F 9/16* (2013.01); *B82Y 30/00* (2013.01); *C22C 14/00* (2013.01); *C22C 19/03* (2013.01); *C22C 29/12* (2013.01); *C23C 28/30* (2013.01); *C25D 1/006* (2013.01); *C25D 1/04* (2013.01); *C25D 11/20* (2013.01); *C25D 11/24* (2013.01); *B82Y 40/00* (2013.01); *C22C 21/00* (2013.01)

(58) Field of Classification Search
CPC ........ B22F 1/0025; B22F 9/16; C22C 14/00; C22C 19/03; C25D 1/006; B82Y 30/00
See application file for complete search history.

(56) References Cited

U.S. PATENT DOCUMENTS

2009/0243584 A1 10/2009 Zhang et al.

*Primary Examiner* — Alexander Polyansky
(74) *Attorney, Agent, or Firm* — Muncy, Geissler, Olds & Lowe, P.C.

(57) ABSTRACT

A method for producing an alumina template of nanorods, the alumina template, and the nanorods are provided for overcoming the problems of the conventional alumina template having anodic aluminum oxide that may be peeled off from a substrate or forming a non-conductive oxide easily, and the alumina template includes a conductive substrate composed of an active metal and an inert metal, so that the alumina template can be attached onto the active metal and inert metal at the same time, and the active metal can be used for securing the alumina template and supporting the alumina template on the inert metal, and the anodic aluminum oxide attached onto the inert metal can be used for providing a better conductivity, such that a stable and highly conductive alumina template can be produced.

12 Claims, 10 Drawing Sheets

Step A depositing a first metal on a substrate, and then depositing a second metal on some portions of the first metal to form a graphic conductive layer.

Step B depositing an alumina membrane on the graphic conductive layer thin film to form an oxidization ready alumina template.

Step C immersing the oxidization ready alumina template in the acid solution to anodize at least once and have aluminum membrane become anodic alumina, then removing barrier layer on the bottom of anodic alumina; forming a plurality number of holes connecting to the graphic conductive layer to form an alumina template.

FIG. 1

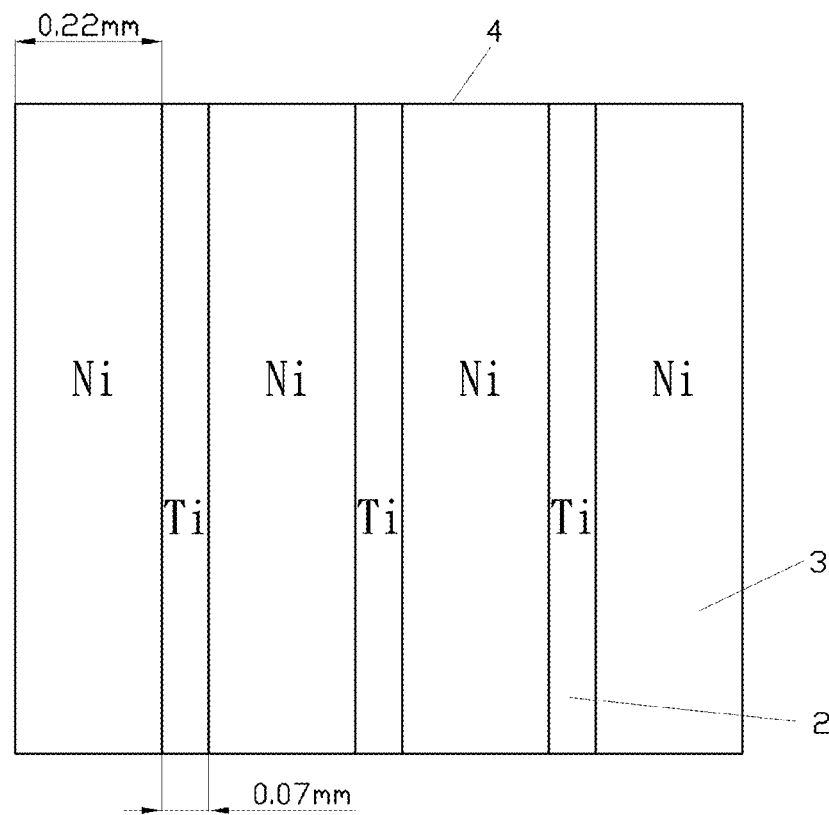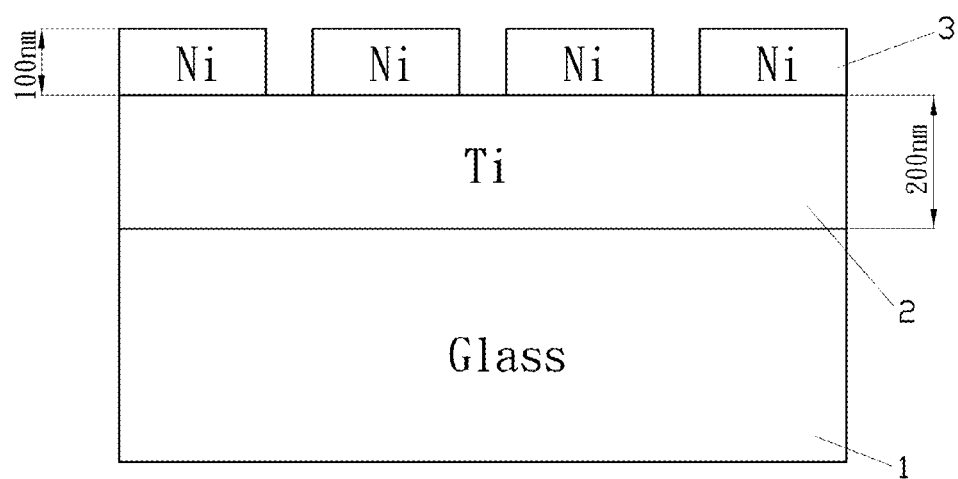
FIG. 3

Step A depositing a first metal on a substrate, and then deposits a second metal on some portions of the first metal to form a graphic conductive layer.

Step B depositing an alumina membrane on the graphic conductive layer thin film to form an oxidization ready alumina template.

Step C immersing the oxidization ready alumina template in the acid solution to anodize at least once and have aluminum membrane become anodic alumina, then removing barrier layer on the bottom of anodic alumina; forming a plurality number of holes connecting to the graphic conductive layer to form an alumina template.

Step D immersing alumina template in plating solution, after chemical reaction, nonarods appear in some holes of alumina template.

Step E removing alumina template and taking out nanorods.

FIG. 8

METHOD FOR PRODUCING ALUMINA TEMPLATE OF NANORODS, ALUMINIA TEMPLATE, AND NANORODS

CROSS REFERENCE TO RELATED APPLICATIONS

This application is a Divisional of co-pending Application No. 13/324,343, filed on Dec. 13, 2011, for which priority is claimed under 35 U.S.C. § 120, the entire contents of all of which are hereby incorporated by reference.

BACKGROUND OF THE INVENTION

1. Field of the Invention

The present invention relates to a method for producing an alumina template of nanorods, the alumina template, and the nanorods thereof, in particular to the alumina template that contains an inert metal and an active metal as a conductive substrate, the method for producing the alumina template, and the method of producing nanorods by the alumina template.

2. Description of the Related Art

To produce nanorods from an alumina template is a known technology. In the process of producing the alumina template, an anodic oxidation technology is applied, and such technology relates to an electrochemical etch reaction. Aluminum is immersed in an acid solution under an electrical field, and the aluminum turns into Anodic Aluminum oxide, AAO. The structure of AOO is similar to a honeycomb with hexagonal single cells and straight holes perpendicular to the template, and a non-conductive barrier layer is formed at the bottom of the hole by oxidation. The barrier layer must be removed before the AAO can be grown into nanorods. However in the process of removing the barrier layer, the following issues arise: AAO is peeled off and the substrate material is oxidized. If an inert metal such as nickel is used as a conductive substrate material during over etch and enlarging hole processes, the inert metal is not easy to be oxidized, the etch occurred on both sides of AAO causes an AAO strip by undercutting. If an active metal such as titanium is used as the conductive substrate, the over etch will not cause the AAO strip, but the active metal will be oxidized and non-conductive oxides will be generated easily, thus causing difficulties to subsequent electroplating process. A better way to solve the above issues is to step down the voltage at the end of anodic oxidation to thin the barrier layer, such that the barrier layer can be removed more easily after the etching. However, the bottom of the holes becomes thinner and has discrepancy which may weaken the support of the subsequent electroplating of nanorods. In addition, the timing of stepping down the voltage is also difficult to control. Obviously, this is not a good method.

SUMMARY OF THE INVENTION

In view of the aforementioned problems of the prior art, it is a primary objective of the present invention to provide a method for producing an alumina template of nanorods, the alumina template, and the nanorods.

To achieve the foregoing objective, the present invention provides a method for producing an alumina template of nanorods comprising a substrate, a first metal on top of the substrate; a second metal on some portions of the first metal and having a graphics conductive layer formed thereon; anodic alumina on the graphic conductive layer, and a plurality of holes formed on the anodic alumina connected to the graphic conductive layer.

Wherein, the first metal is an active metal selected from the following: titanium, zirconium, hafnium, tantalum, vanadium or chromium; and the second metal is an inert metal selected from the following: nickel, gold, silver, palladium, platinum or copper.

Wherein, the first metal is an inert metal selected the following: nickel, gold, silver, palladium, platinum or copper; and the second metal is an active metal selected from the following: titanium, zirconium, hafnium, tantalum, vanadium or chromium.

To achieve the foregoing objective, the present invention provides a method for producing an alumina template comprising in following steps: Step A: deposit a first metal in a substrate thin film, then deposit a second metal on the first metal film to form a graphic conductive layer; Step B: deposit an alumina membrane on the graphic conductive thin film to form an oxidization ready alumina template; Step C: immerse the oxidization ready alumina template in an acid solution to anodize at least once and turn the aluminum membrane into anodic alumina, then remove the barrier layer from the bottom of anodic alumina; a plurality of holes connected to the graphic conductive layer, so as to form the alumina template.

Wherein, the first metal is an active metal selected from the following: titanium, zirconium, hafnium, tantalum, vanadium or chromium; and the second metal is an inert metal selected from the following: nickel, gold, silver, palladium, platinum or copper.

Wherein, the first metal is an inert metal selected from the following: nickel, gold, silver, palladium, platinum or copper; and the second metal is an active metal selected from the following: titanium, zirconium, hafnium, tantalum, vanadium or chromium.

To achieve the foregoing objective, the present invention provides a method for producing nanorods comprising the above-mentioned method for producing the alumina template and further comprising another Step D to immerse the alumina template in a plating solution or in a chemical vapor deposition oven; after a chemical reaction takes place, nanorods appear in some holes of the alumina template; and Step E to remove the alumina template and take out the nanorods.

Wherein, the nanorods are made of nickel.

Wherein, some holes described in the process D are connected to the first metal.

Wherein, some holes described in the process D are connected to the second metal.

BRIEF DESCRIPTION OF THE DRAWINGS

FIG. 1 is a flowchart of a method for producing an alumina template of the present invention;

FIG. 3 shows top and side views of a conductive layer of an alumina template of nanorods in accordance with a preferred embodiment of the present invention;

FIG. 8 is a flowchart of a method for producing nanorods in accordance with a preferred embodiment of the present invention;

DETAILED DESCRIPTION OF THE PREFERRED EMBODIMENTS

The technical content of the present invention will become apparent by the detailed description of the following embodiments and the illustration of related drawings as follows.

Figure 7:
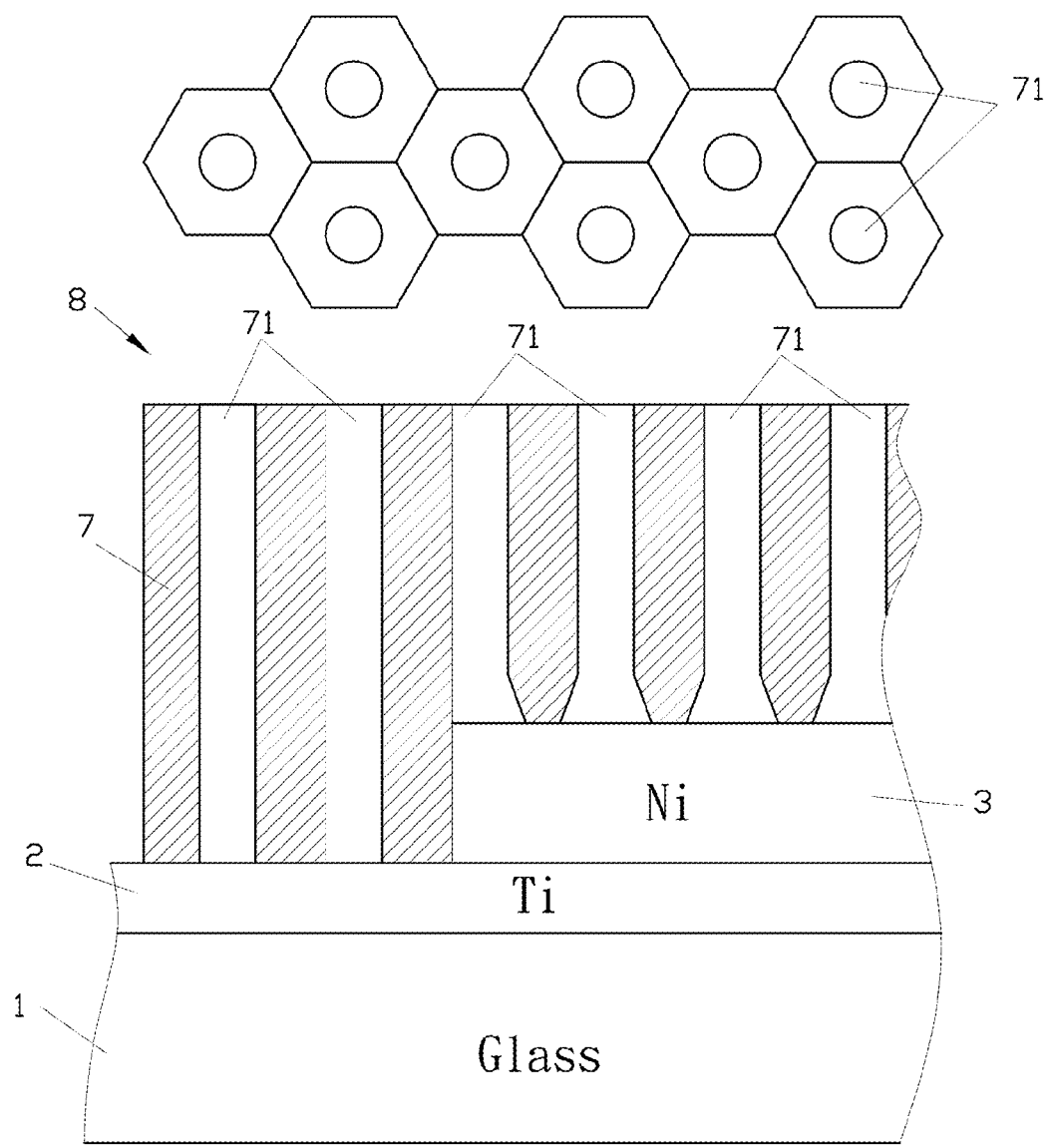
FIG. 7 is another cross-section view of an alumina template of a method of producing alumina template in accordance with a preferred embodiment of the present invention.

With reference to FIGS. 1 and 7, a flow chart of a method for producing alumina template of nanorods in accordance with a preferred embodiment of the present invention comprises the following steps:

Step A Deposit a first metal 2 on a substrate 1 (glass), and then deposit a second metal 3 on some portions of the first metal 2 to form a graphic conductive layer 4; the graphic pattern of the graphic conductive layer 4 varies with different positions of the second metal 3 deposited on the first metal 2, such as straight lines, and oblique lines, orthogonal lines, cross lines or curve lines (as shown on FIGS. 2A to 2E). In this preferred embodiment of the present invention, two different ways are used to form the graphic conductive layer 4:

Step A1, with reference to FIG. 3, the first metal 2 plated on substrate I is an active metal, and the active metal used in this preferred embodiment is titanium (Ti) (other metal elements such as zirconium (Zr), halfnium (Hf), vanadium (V), chromium (Cr), and tantalum (Ta) are also applicable); the thickness of plated titanium is 200 nm. The second metal 3 plated on the first metal 2 is an inert metal, and the inert metal used in this preferred embodiment is nickel (Ni) (other metal elements such as gold (Au), silver (Ag), platinum (Pt), palladium (Pd), copper (Cu) are also applicable); the thickness of plated nickel is 100 nm to form graphic a conductive layer 4. The thickness of the first metal 2 must be sufficient to offer proper conductivity; the thickness of the second metal 3 is to prevent the first metal 2 from being oxidized, so that the thickness of the second metal 3 can be thinner than the first metal 2. The width of the first metal 2 is 0.07 mm, and the thickness of the second metal 3 is 0.22 mm, and the range of width can be defined by designers.

Figure 2A:
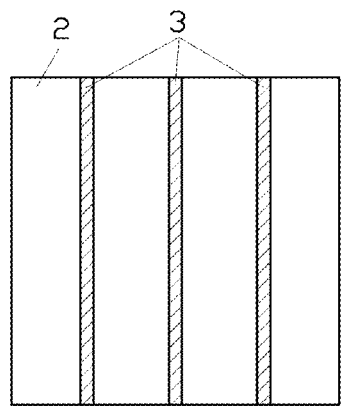
FIGS. 2A to 2E are perspective views of a conductive layer of an alumina template of nanorods in accordance with a preferred embodiment of the present invention.
Figure 2B:
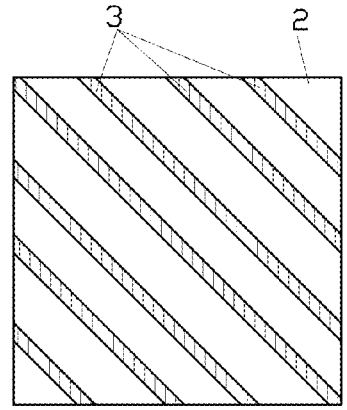
Figure 2C:
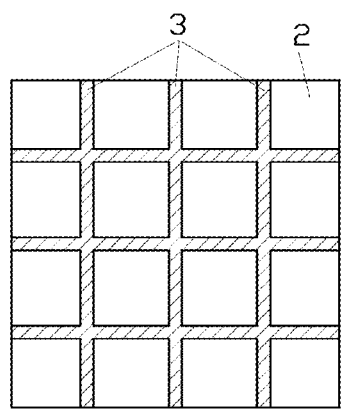
Figure 2D:
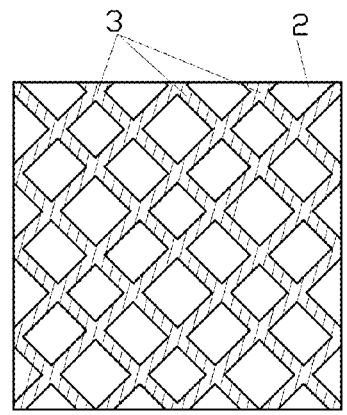
Figure 2E:
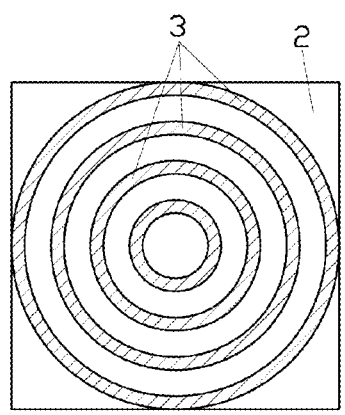
Figure 4:
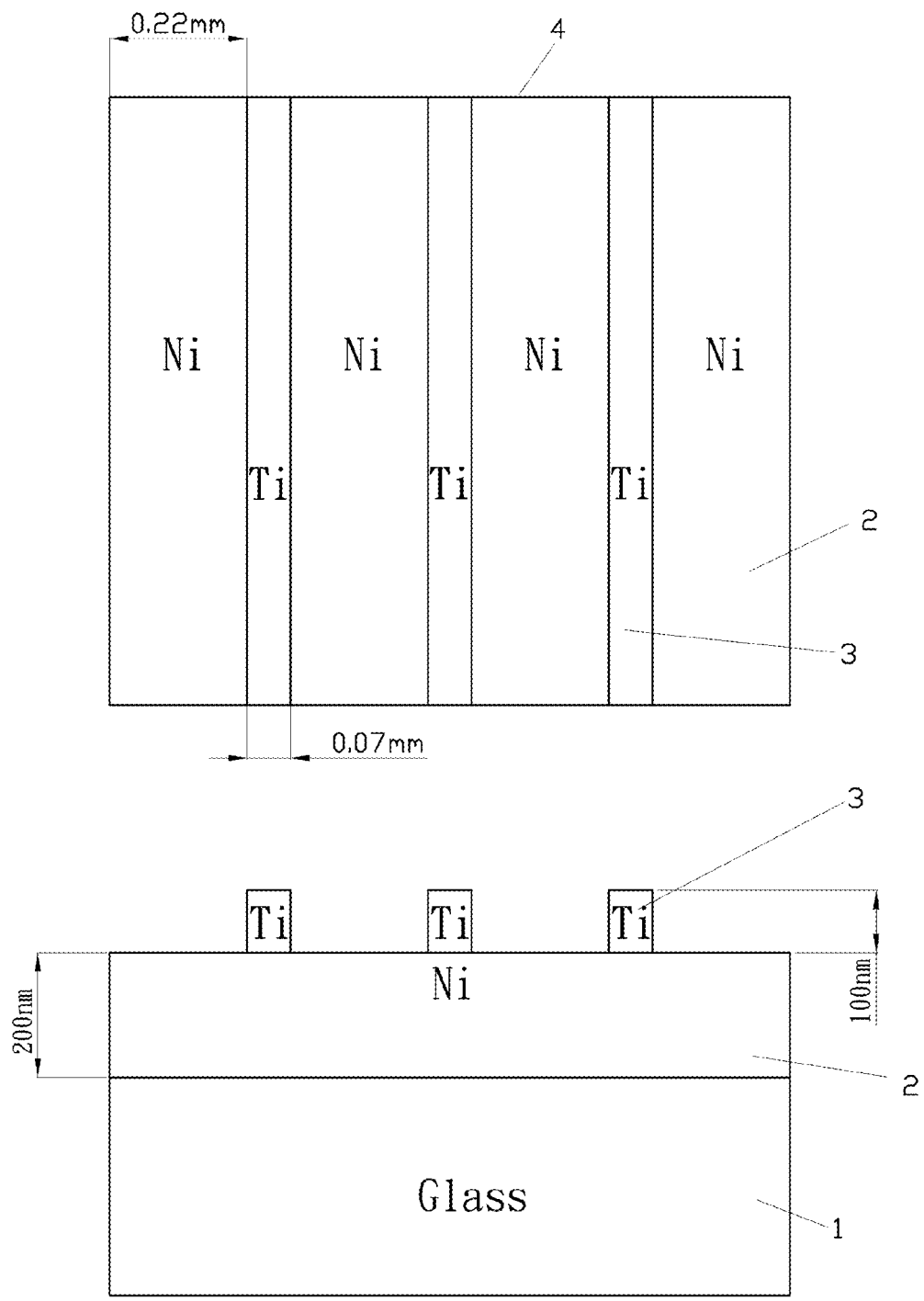
FIG. 4 shows other top and side views of a conductive layer of an alumina template of nanorods in accordance with a preferred embodiment of the present invention.

Step A2, with reference to FIG. 4, the first metal 2 plated on substrate 1 is an inert metal, and in this preferred embodiment, nickel (Ni) is applied (other metal elements such as gold (Au), silver (Ag), platinum (Pt), palladium (Pd) and copper (Cu) are also applicable), the thickness of nickel platted is 200 nm. The second metal 3 plated on the first metal 2 is an active metal, and in this preferred embodiment, titanium (Ti) is applied (other metal elements such as zirconium (Zr), halfnium (Hf), Vanadium (v), chromium (Cr), tantalum (Ta) are also applicable), and the thickness of titanium platted is 100 nm to form a graphic conductive layer 4.

Figure 5:
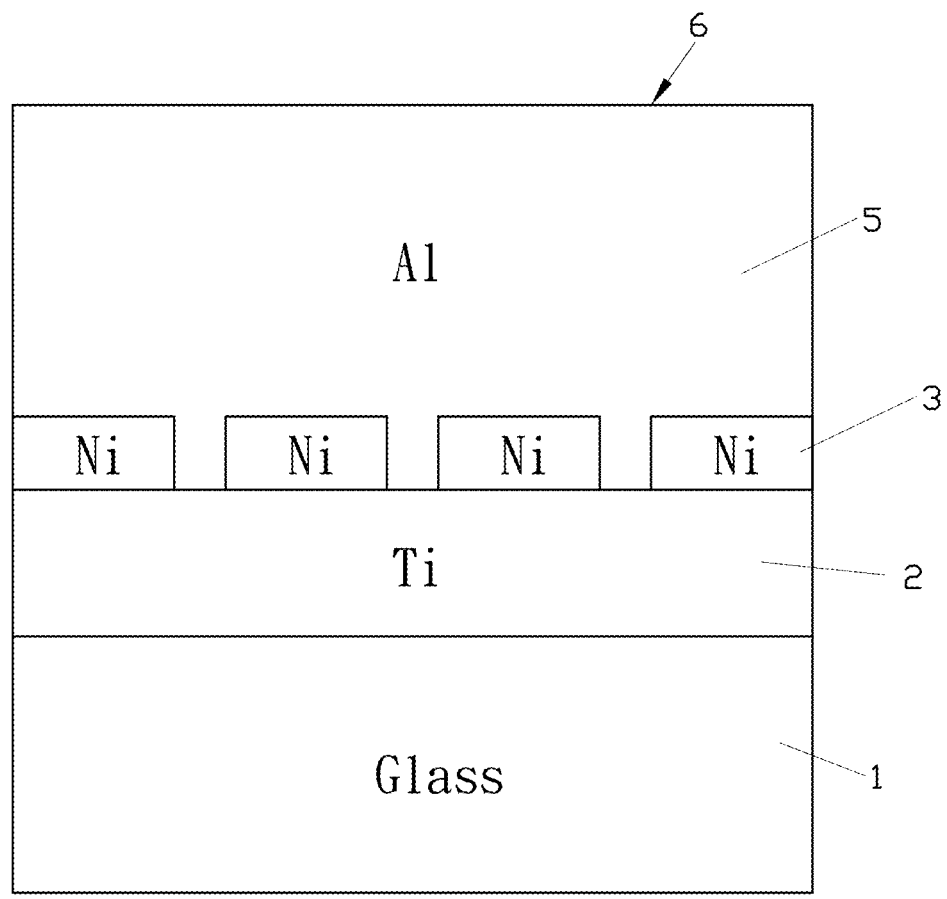
FIG. 5 is a cross-section view of an alumina template in accordance with a preferred embodiment of the present invention.

Step B, with reference to FIG. 5, an aluminum membrane 5 is deposited on the graphic conductive layer 4 to form an oxidation ready alumina template 6; and the thickness of aluminum membrane 5 is between 0.3 μm and 10 μm.

Figure 6:
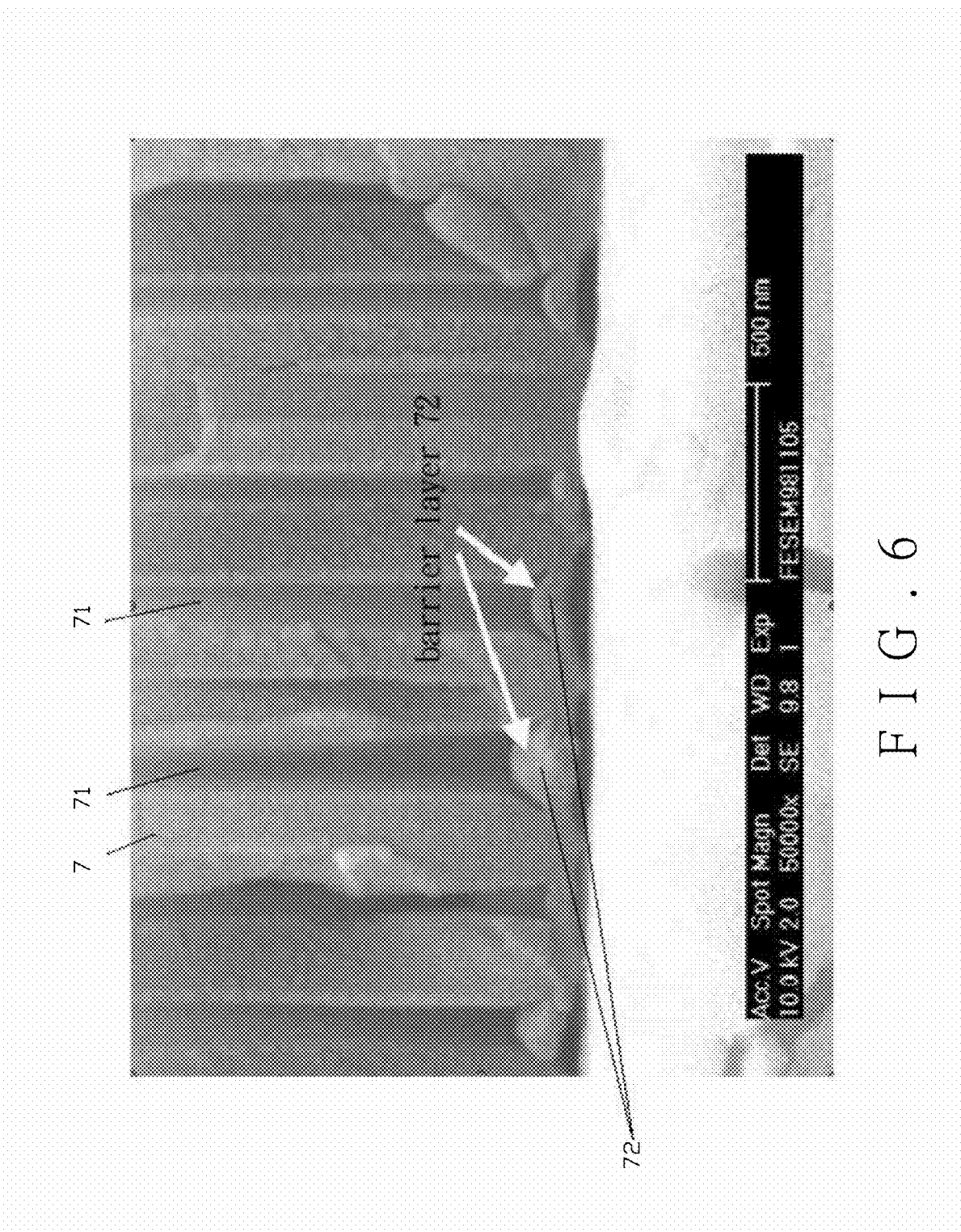
FIG. 6 is a cross-section view of a barrier layer of a method for producing an alumina template in accordance with a preferred embodiment of the present invention.

Step C, the oxidation ready alumina template 6 is immersed in an acid solution, and anodized at least once, and the aluminum membrane 5 goes through an electrochemical etch reaction, and let the aluminum membrane 5 become anodic aluminum oxide AAO 7. The principle of performing an anodic oxidation process of the aluminum film 5 is a known technology. In this preferred embodiment, phosphate is used as the acid solution for the anodic oxidation process, and the concentration is 0.2 M, the temperature is 5 degrees Celsius, and a voltage of 130 volts is applied for 100 minutes to form a plurality of holes 71 connecting to the graphic conductive layer 4 on AAO 7, and the size of the hole 71 is about 200 nm; the barrier layer 72 formed on the bottom of AAO 7 during the anodic oxidation process, is a known problem. With reference to FIG. 6, extra steps are executed in this preferred embodiment during the anodic oxidation process: the alumina template is immersed in phosphate of 0.5M concentration for 6 for 30 minutes at the temperature of 25 degrees Celsius to expand the holes 71 and eliminate the barrier layer 72. If metal nickel is used as the conductive substrate of the aluminum membrane 5, the etch process will not cause AAO 7 to peel towards both sides, but AAO 7 may be peeled off by undercutting. If titanium is used as the conductive substrate of the aluminum membrane 5, the over etch may not cause AAO 7 to peel off, but the active metal is oxidized to generate non-conductive oxides easily, which causes difficulties to the subsequent electroplating process. In this embodiment, the oxidation ready alumina template 6 has a graphic conductive layer 4 with active and inert metals for the anodic oxidation, and attaching AAO 7 onto the active metal can avoid its peeling off during the over etch to remove the barrier layer 72, and an alumina template 8 with secured holes 71 and good conductivity can be formed as shown in FIG. 7.

Figure 9:
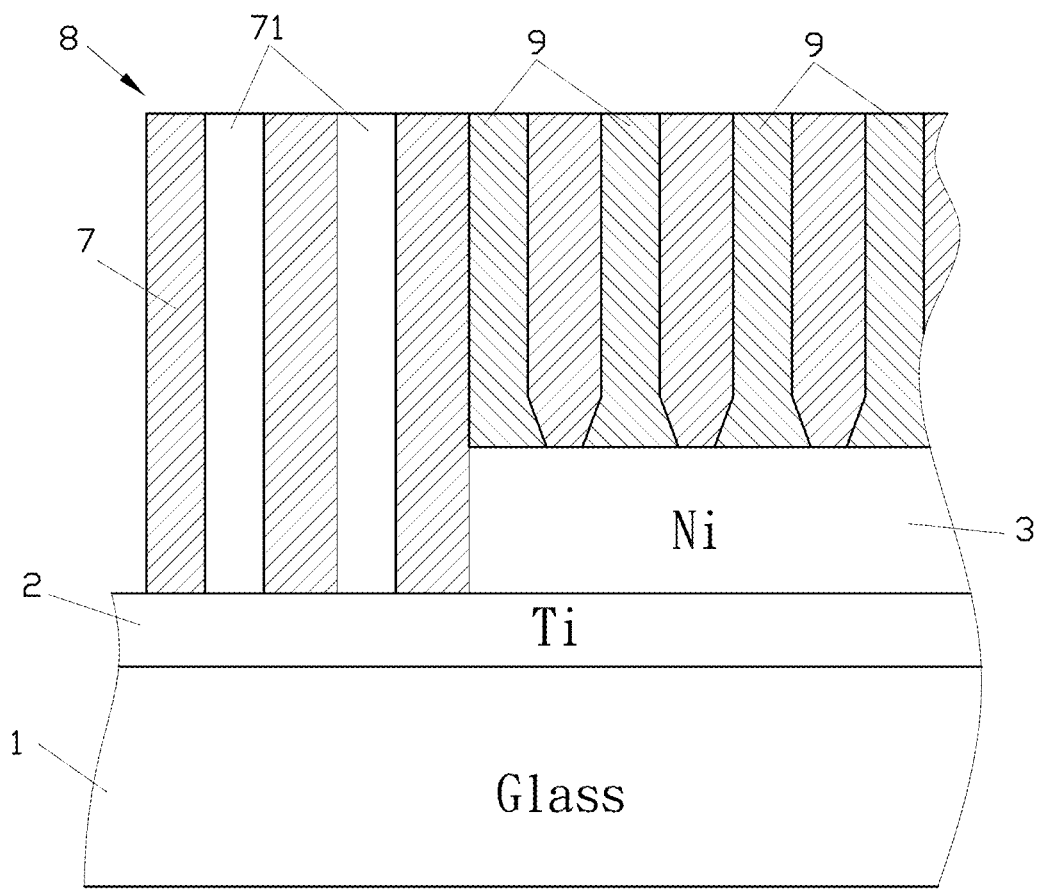
FIG. 9 is a perspective view of nanorods produced in some holes of an alumina template in accordance with a preferred embodiment of the present intention.

With reference of FIG. 8 for a method for producing nanorods in accordance with a preferred embodiment of the present invention, this method further comprises the following steps in addition to the steps of the aforementioned method of producing the alumina template 8 of the present invention:

Step D, in this embodiment, nanorods 9 is made from a chemical process such as an electrochemical or chemical deposition (chemical vapor deposition oven). The alumina template 8 is immersed in a plating solution which is amino sulfonic acid solution, and the electrical current applied is 2 mA per square centimeter, and the temperature is 50 degrees Celsius, and the duration is 10 minutes. After these processes are finished, nanorods 9 are produced in some holes 71 of the alumina template 8. The holes 71 are formed on the substrate by nickel (as shown in FIG. 9).

Figure 10:
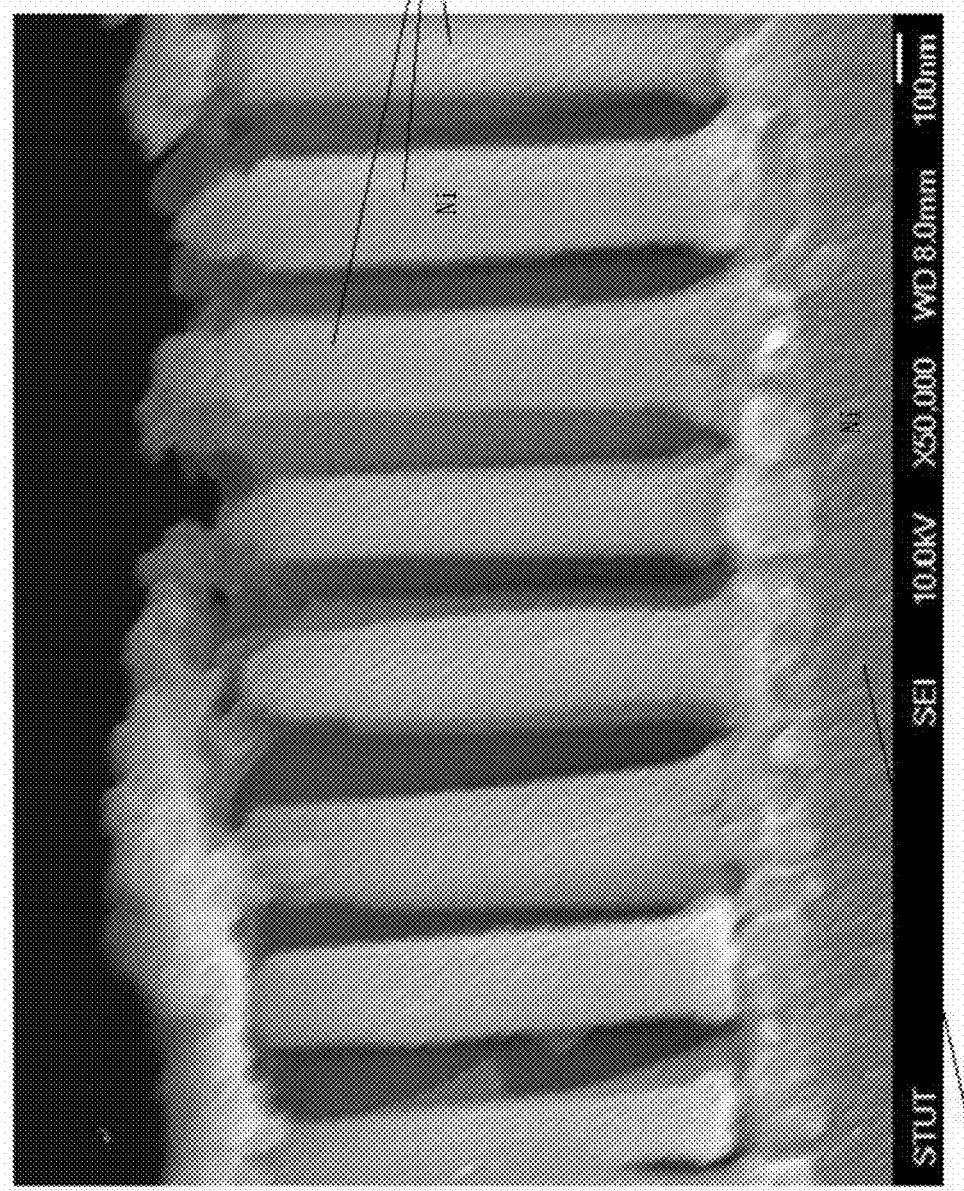
FIG. 10 is a perspective view of produced nanorods in accordance with a preferred embodiment of the present intention.

Step E, with reference of FIG. 10, this embodiment uses NaOH solution with a concentration of 5 wt % to remove the alumina template 8, so that the nanorods 9 can be taken out.

While a preferred embodiment of the invention has been shown and described in detail, it will be readily understood and appreciated that numerous omissions, changes and additions may be made without departing from the spirit and scope of the invention.

What is claimed is:

1. A method for producing an alumina template, comprising the steps of:

step A: depositing a first metal in a substrate thin film, and depositing a second metal on said first metal film to form a graphic conductive layer;

step B: depositing an alumina membrane on said graphic conductive layer thin film to form an oxidization ready alumina template;

step C: immersing said oxidization ready alumina template in an acid solution to anodize at least once and turn said aluminum membrane into anodic alumina, removing the barrier layer from the bottom of said anodic alumina, and forming a plurality number of holes connecting to said graphic conductive layer to form an alumina template, and wherein the anodic alumina is deposited on said graphic conductive layer such that some parts of said anodic alumina are in direct contact with said first metal, and the other parts of said anodic alumina are in direct contact with said second metal.

2. The method for producing an alumina template as recited in claim 1, wherein said first metal is an active metal, and said second metal is an inert metal.

3. The method for producing alumina template of claim 2, wherein said first metal is one selected, from the collection of titanium, zirconium, hafnium, tantalum, vanadium and chromium, and said second metal is one selected from the collection of nickel, gold, silver, palladium, platinum and copper.

4. The method for producing an alumina template as recited in claim 1, wherein said first metal is an inert metal, and said second metal is an active metal.

5. The method for producing an alumina template as recited in claim 4, wherein said first metal is one selected from the collection of nickel, gold, silver, palladium, platinum and copper, and said second metal is one selected from the collection of titanium, zirconium, hafnium, tantalum, vanadium and chromium.

6. A method for producing nanorods comprising the steps of:

step A: depositing a first metal in a substrate thin film, and depositing a second metal on said first metal film to form a graphic conductive layer;

step B: depositing an alumina membrane on said graphic conductive layer thin film to form an oxidization ready alumina template;

step C: immersing said oxidization ready alumina template in an acid solution to anodize at least once and turn said aluminum membrane into anodic alumina, and removing a barrier layer from the bottom of said anodic alumina, and forming a plurality number of holes connecting to said graphic conductive layer to produce the alumina template;

step D: immersing said alumina template in a plating solution or in a chemical vapor deposition oven, such that after the chemical reaction is finished, nanorods are formed in some of said holes of said alumina template;

step E: removing said alumina template and taking out said nanorods, and wherein the anodic alumina is deposited on said graphic conductive layer such that some parts of said anodic alumina are in direct contact with said first metal, and the other parts of said anodic alumina are in direct contact with said second metal.

7. The method for producing nanorods of claim 6, wherein said nanorods are made of metal nickel.

8. The method for producing nanorods of claim 6, wherein some of said holes described in the step D are connected to said second metal.

9. The method for producing nanorods of claim 6, wherein said first metal is an active metal, and said second metal is an inert metal.

10. The method for producing nanorods of claim 9, wherein said first metal is one selected from the collection of titanium, zirconium, hafnium, tantalum, vanadium and chromium, and said second metal is one selected from the collection of nickel, gold, silver, palladium, platinum and copper.

11. The method for producing nanorods of claim 6, wherein said first metal is an inert metal, and said second metal is an active metal.

12. The method for producing nanorods of claim 11, wherein said first metal is one selected from the collection of nickel, gold, silver, palladium, platinum and copper, and said second metal is one selected from the collection of titanium, zirconium, hafnium, tantalum, vanadium and chromium.

* * * * *

UNITED STATES PATENT AND TRADEMARK OFFICE
CERTIFICATE OF CORRECTION

| | |
|---|---|
| PATENT NO. | : 9,458,548 B2 |
| APPLICATION NO. | : 13/963296 |
| DATED | : October 4, 2016 |
| INVENTOR(S) | : Hsyi-En Cheng et al. |

It is certified that error appears in the above-identified patent and that said Letters Patent is hereby corrected as shown below:

In (54), the title should be changed from "METHOD FOR PRODUCING ALUMINA TEMPLATE OF NANORODS, ALUMINIA TEMPLATE, AND NANORODS" to --METHOD FOR PRODUCING ALUMINA TEMPLATE OF NANORODS, ALUMINA TEMPLATE, AND NANORODS--

Signed and Sealed this
Sixth Day of June, 2017

Michelle K. Lee
*Director of the United States Patent and Trademark Office*